United States Patent Office 2,768,927
Patented Oct. 30, 1956

2,768,927

METHOD OF KILLING INSECTS WITH ALKYL PHENYLSUCCINIMIDES AND FABRIC IMPREGNATED THEREWITH

Samuel J. Ringel and Louis Feinstein, Washington, D. C., dedicated to the free use of the People of the United States No Drawing. Application May 7, 1953,
Serial No. 353,690

12 Claims. (Cl. 167—33)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

We hereby dedicate the invention herein described to the free use of the People in the territory of the United States to take effect on the granting of a patent to us.

This invention relates to insecticides. More particularly, it relates to lousicides.

We have found that certain N-alkyl-alpha-phenylsuccinimides, the N-ethyl- and N-methyl-derivatives, in particular, are effective against human body lice (*Pediculus humanus corporis*). These compounds are prepared according to the method disclosed by Miller and Long in Journal of the American Chemical Society, vol. 73, pp. 4895–4898 (1951).

N-ethyl-alpha-phenylsuccinimide is the most effective compound of the series, and its effectiveness may be illustrated by the following example which is not intended as a limitation on the usefulness and scope of our invention:

A piece of cloth was impregnated by dipping it into a 1% solution of N-ethyl-alpha-phenylsuccinimide in acetone. The cloth was then set in a beaker and human body lice (*Pediculus humanus corporis*) placed daily upon the impregnated cloth. The lice were killed; and the cloth retained its killing power for a period of at least 31 days.

A piece of cloth, treated in a similar manner with N-methyl-alpha-phenylsuccinimide, was effective for 1 to 2 days.

The following compounds in the same series were also tested against human body lice and found to be effective, although for less than a day:

N-propyl-alpha-phenylsuccinimide,
N-allyl-alpha-phenylsuccinimide,
N-butyl-alpha-phenylsuccinimide,
N-(2-hydroxyethyl)-alpha-phenylsuccinimide,
N-isopropyl-alpha-phenylsuccinimide,
N-isobutyl-alpha-phenylsuccinimide,
N-sec-butyl-alpha-phenylsuccinimide,
N-amyl-alpha-phenylsuccinimide.

We claim:
1. The method of killing insects which comprises exposing them to contact with an N-alkyl-alpha-phenylsuccinimide in which the alkyl group contains from 1 to 5 carbon atoms.
2. The method of killing human body lice which comprises exposing them to contact with an N-alkyl-alpha-phenylsuccinimide in which the alkyl group contains from 1 to 5 carbon atoms.
3. The method of killing human body lice which comprises exposing them to contact with a compound selected from the group consisting of N-methyl-alpha-phenylsuccinimide and N-ethyl-alpha-phenylsuccinimide.
4. The method of killing human body lice which comprises exposing them to contact with N-methyl-alpha-phenylsuccinimide.
5. The method of killing human body lice which comprises exposing them to contact with N-ethyl-alpha-phenylsuccinimide.
6. The method of killing human body lice which comprises impregnating a fabric with a solution of a compound selected from the group consisting of N-methyl-alpha-phenylsuccinimide and N-ethyl-alpha-phenylsuccinimide, and exposing said lice to contact with the impregnated fabric.
7. The method of killing human body lice which comprises impregnating a fabric with a solution of N-methyl-alpha-phenylsuccinimide, and exposing said lice to contact with the impregnated fabric.
8. The method of killing human body lice which comprises impregnating a fabric with a solution of N-ethyl-alpha-phenylsuccinimide, and exposing said lice to contact with the impregnated fabric.
9. A fabric impregnated with an N-alkyl-alpha-phenylsuccinimide in which the alkyl group contains from 1 to 5 carbon atoms.
10. A fabric impregnated with a compound selected from the group consisting of N-methyl-alpha-phenylsuccinimide and N-ethyl-alpha-phenylsuccinimide.
11. A fabric impregnated with N-methyl-alpha-phenylsuccinimide.
12. A fabric impregnated with N-ethyl-alpha-phenylsuccinimide.

References Cited in the file of this patent

UNITED STATES PATENTS

| | | |
|---|---|---|
| 2,545,283 | Johnson | Mar. 13, 1951 |
| 2,643,258 | Miller | June 23, 1953 |
| 2,657,215 | Shelley | Oct. 27, 1953 |

OTHER REFERENCES

Frear: A Catalogue of Insecticides and Fungicides, vol. 1, pages 18, 19 and 104 (1947).